United States Patent
Nakatani et al.

(10) Patent No.: US 7,854,182 B2
(45) Date of Patent: Dec. 21, 2010

(54) OPERATING APPARATUS FOR HYDROSTATIC CONTINUOUSLY VARIABLE SPEED-CHANGE DEVICE FOR WORK VEHICLE

(75) Inventors: Yasunobu Nakatani, Sakai (JP); Fumitake Okunishi, Kawachinagano (JP); Yoshifumi Horiuchi, Sakai (JP); Hiroki Bessho, Sakai (JP); Yoshihiro Kawahara, Sakai (JP); Mitsugu Kobayashi, Sakai (JP); Shinichiro Saji, Sakai (JP); Masaki Hayashi, Sakai (JP)

(73) Assignee: Kubota Corporation, Osaka (JP)

( * ) Notice: Subject to any disclaimer, the term of this patent is extended or adjusted under 35 U.S.C. 154(b) by 665 days.

(21) Appl. No.: 11/714,081

(22) Filed: Mar. 5, 2007

(65) Prior Publication Data

US 2007/0219047 A1    Sep. 20, 2007

(30) Foreign Application Priority Data

Mar. 13, 2006    (JP)    ............................. 2006-067459

(51) Int. Cl.
  F16D 31/02    (2006.01)
  B60K 17/10    (2006.01)
  B60K 17/00    (2006.01)
  F16H 47/00    (2006.01)

(52) U.S. Cl. ..................... 74/732.1; 74/733.1; 180/367; 180/370; 60/494

(58) Field of Classification Search ................ 74/732.1, 74/733.1; 180/242, 315, 367, 370; 60/494
See application file for complete search history.

(56) References Cited

U.S. PATENT DOCUMENTS 3,740,950 A * 6/1973 Polaski ......................... 60/459
4,976,666 A * 12/1990 Meyerle ....................... 475/83
5,114,385 A * 5/1992 Meyerle ....................... 475/79
5,222,921 A * 6/1993 Garcia ......................... 475/72
5,683,322 A * 11/1997 Meyerle ....................... 475/72
6,099,367 A * 8/2000 White et al. .................... 440/5
6,151,895 A * 11/2000 Matsura ....................... 60/490
6,849,028 B2 * 2/2005 Nakatani et al. ............... 477/52
6,852,064 B2 * 2/2005 Carlson et al. ................ 477/52
6,874,319 B2 * 4/2005 Nakatani ...................... 60/484
6,942,596 B2 * 9/2005 Carlson et al. ................ 477/52
7,086,227 B2 * 8/2006 Yano et al. .................... 60/433
7,334,403 B2 * 2/2008 Markwart ..................... 60/460
2005/0145429 A1 * 7/2005 Hasegawa .................... 180/242
2006/0016186 A1 * 1/2006 Dong et al. ................... 60/494

FOREIGN PATENT DOCUMENTS

| JP | 53018132 A | | 2/1978 |
|---|---|---|---|
| JP | 11351382 A | * | 12/1999 |
| JP | 2003156145 A | | 5/2003 |
| JP | 2004-257447 | | 9/2004 |
| WO | WO 8401419 A | * | 4/1984 |

* cited by examiner

*Primary Examiner*—Tisha D Lewis
(74) *Attorney, Agent, or Firm*—The Webb Law Firm (57) ABSTRACT

A work vehicle includes a hydrostatic continuously variable speed-change device, a gear type multiple-stage speed-change device disposed downstream of the hydrostatic continuously variable speed-change device with respect to a direction in which power is transmitted, first and second oil passages, a bypass oil passage communicating the first and second oil passages with each other, a valve mechanism for opening and closing the bypass oil passage, and a manual operating member provided in a driving section for opening and closing the valve mechanism.

5 Claims, 11 Drawing Sheets

OPERATING APPARATUS FOR HYDROSTATIC CONTINUOUSLY VARIABLE SPEED-CHANGE DEVICE FOR WORK VEHICLE

BACKGROUND OF THE INVENTION

The present invention relates to a work vehicle such as an agricultural work vehicle, a transporter vehicle, a grass mower, a multi-purpose vehicle, including a traveling transmission line having a gear type auxiliary speed-change device disposed transmission-wise downstream of a hydrostatic continuously variable speed-change device (HTT).

A multi-purpose vehicle as an example of the above-described work vehicle is known from e.g. JP 2004-257447. In this, engine power is inputted to a main speed-change device (HST) to be speed-changed steplessly and this speed-changed output in a predetermined rotational direction is transmitted to a gear type auxiliary speed-change device which effects switchover between forward traveling and reverse traveling and effects also multi-stage speed changing operations in the forward traveling speed.

With the above-described transmission construction, when a switchover operation of the auxiliary speed-change device is to be effected, the speed-changing operation is effected with actuating a drivetrain brake. However, when e.g. an auxiliary speed-changing operation is to be effected during an upslope traveling, if there exists a significant pressure difference in the speed-changing oil passage of the HST, that is, if the gear shifting operation is to be effected while the auxiliary speed-change device is being subjected to the torque from the HST, the shifting operation cannot sometimes be effected smoothly, thus inviting great trouble of having to effect the speed-changing operations for a plurality of time in repetition.

SUMMARY OF THE INVENTION

The present invention has been made in view of the above-described state of the art. An object of the invention is to allow smooth and easy speed-changing operation of an auxiliary speed-change device even while this auxiliary speed-change device is receiving torque outputted from a main speed-change device.

A work vehicle, according to the present invention, comprises:

a hydrostatic continuously variable speed-change device;

a gear type multiple-stage speed-change device disposed downstream of the hydrostatic continuously variable speed-change device with respect to a direction in which power is transmitted;

first and second oil passages interconnecting between a hydraulic pump and a hydraulic motor in the hydrostatic continuously variable speed-change device;

a bypass oil passage communicating the first and second oil passages with each other;

a valve mechanism for opening and closing the bypass oil passage; and a manual operating member provided in a driving section for opening and closing the valve mechanism.

DETAILED DESCRIPTION OF PREFERRED EMBODIMENTS

Next, preferred embodiments of the invention will be described with reference to the accompanying drawings.

Figure 1:
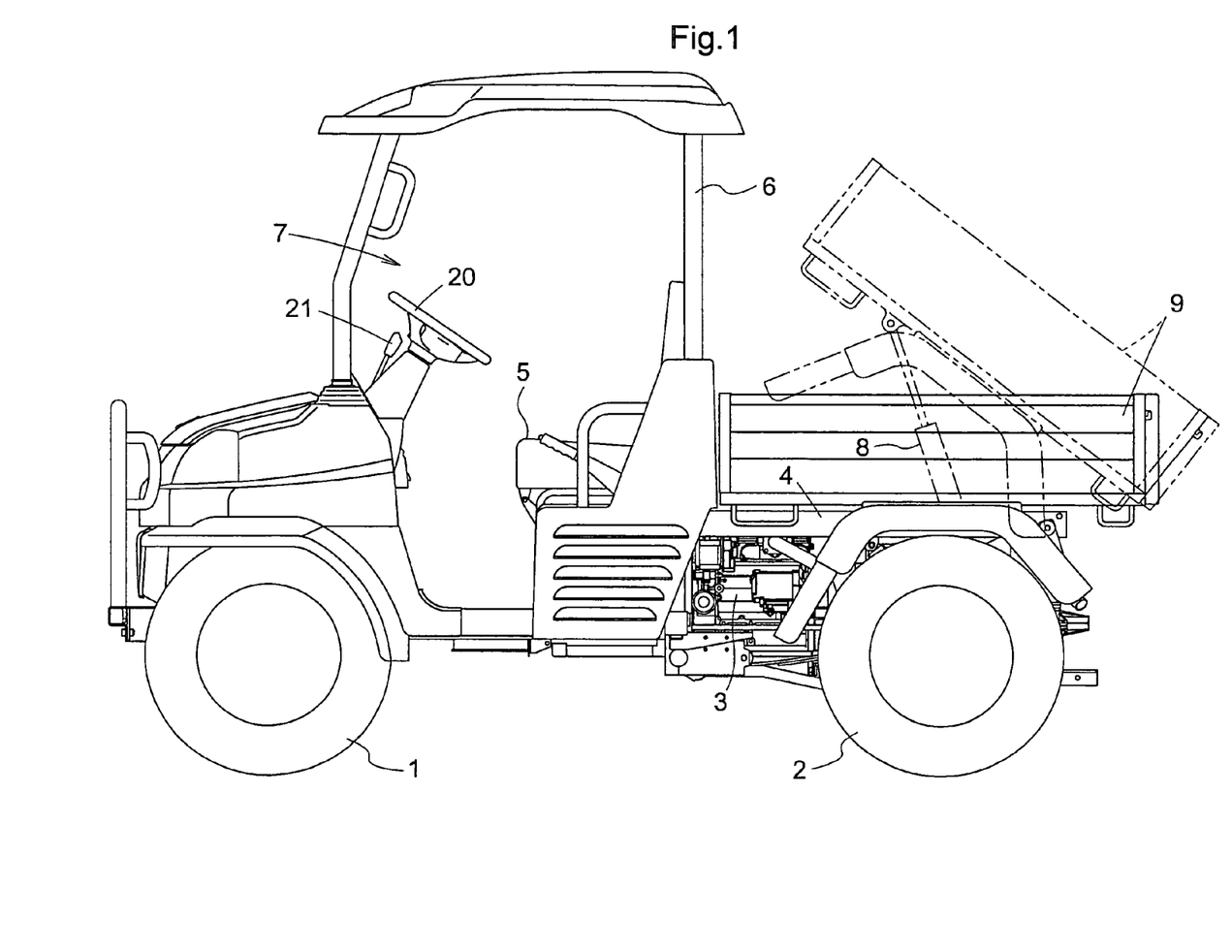
FIG. 1 is a general side view showing a work vehicle.
Figure 2:
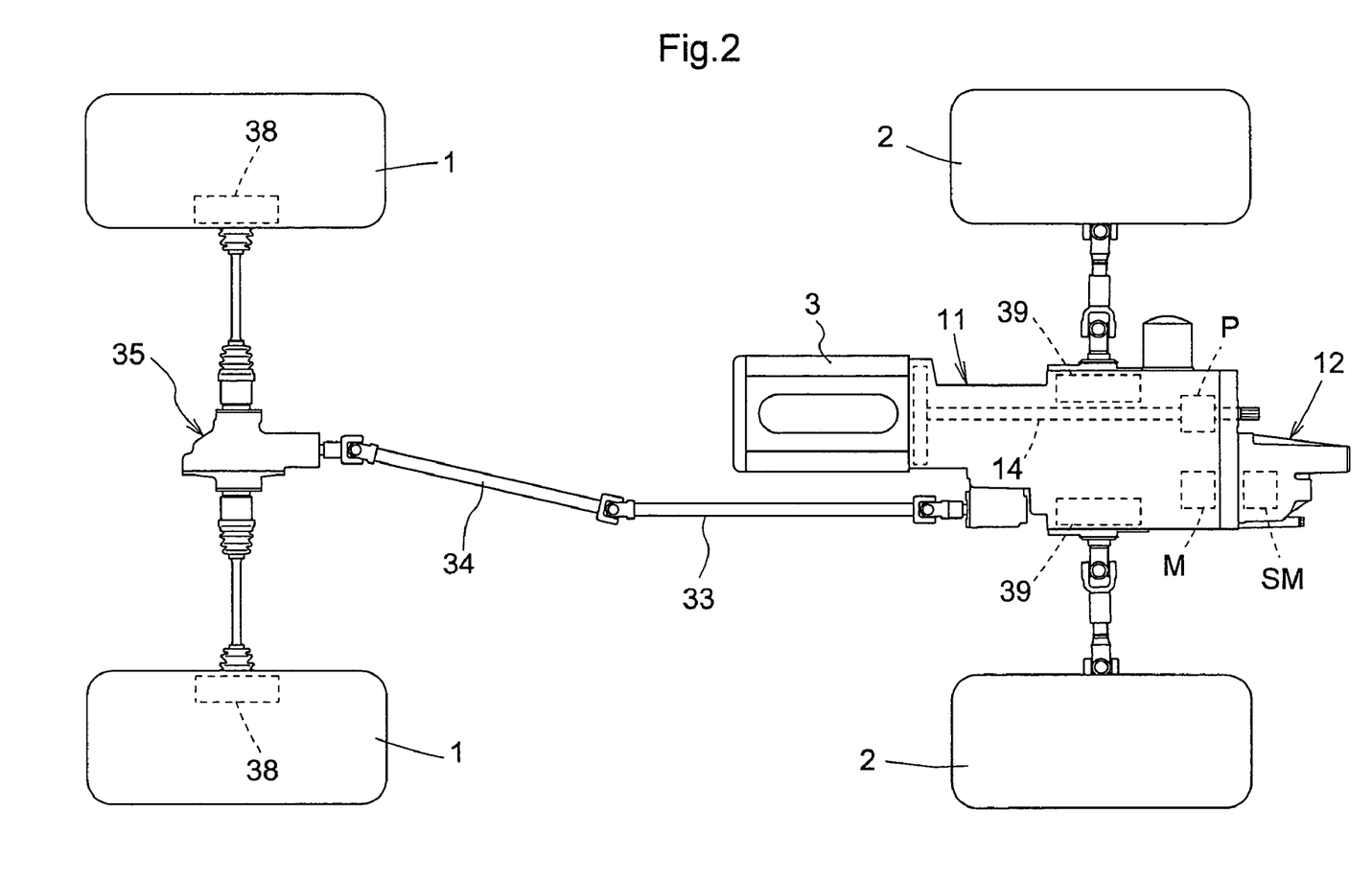
FIG. 2 is a plan view showing a drivetrain.
Figure 3:
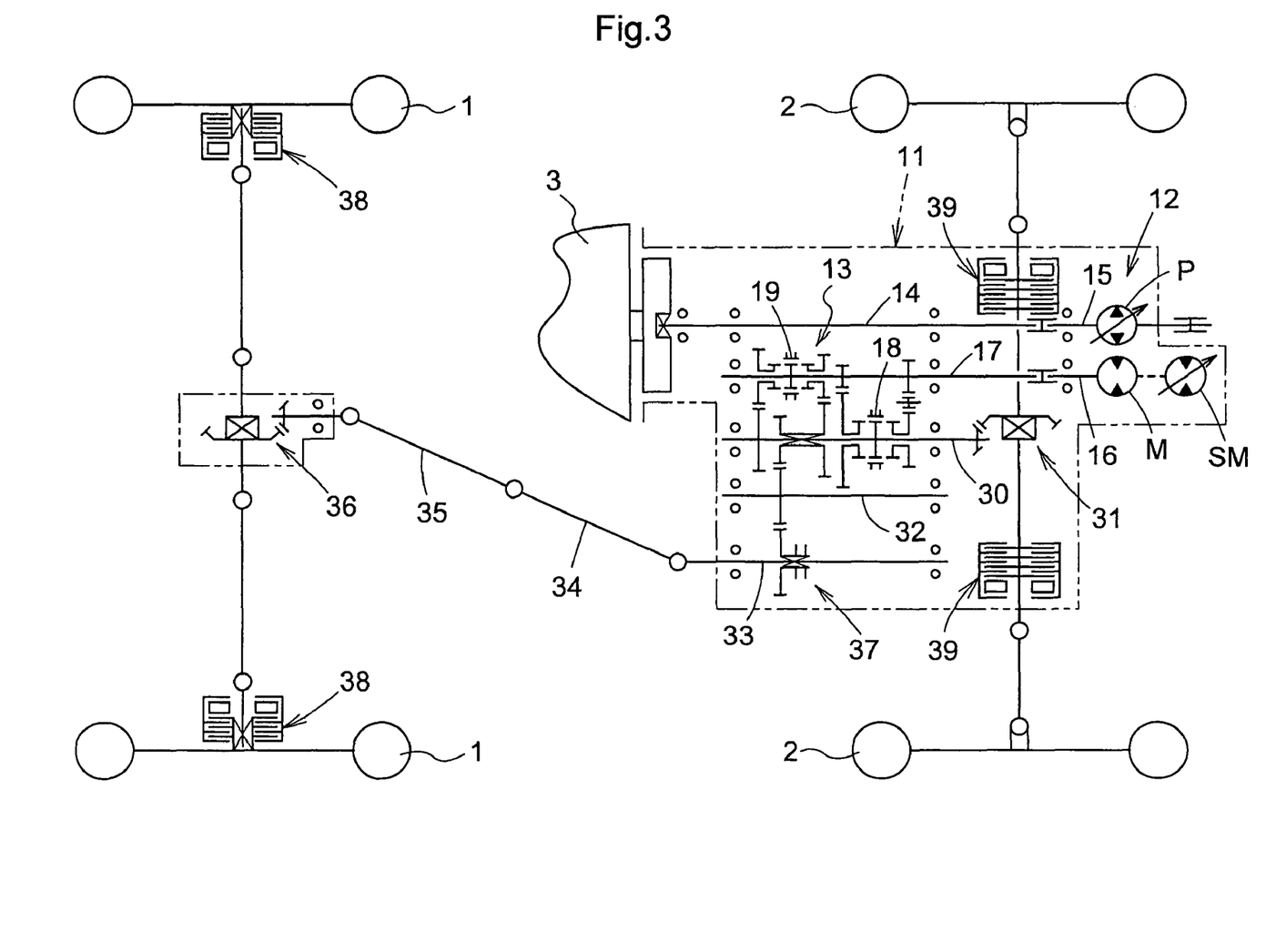
FIG. 3 is a traveling transmission line diagram.
Figure 4:
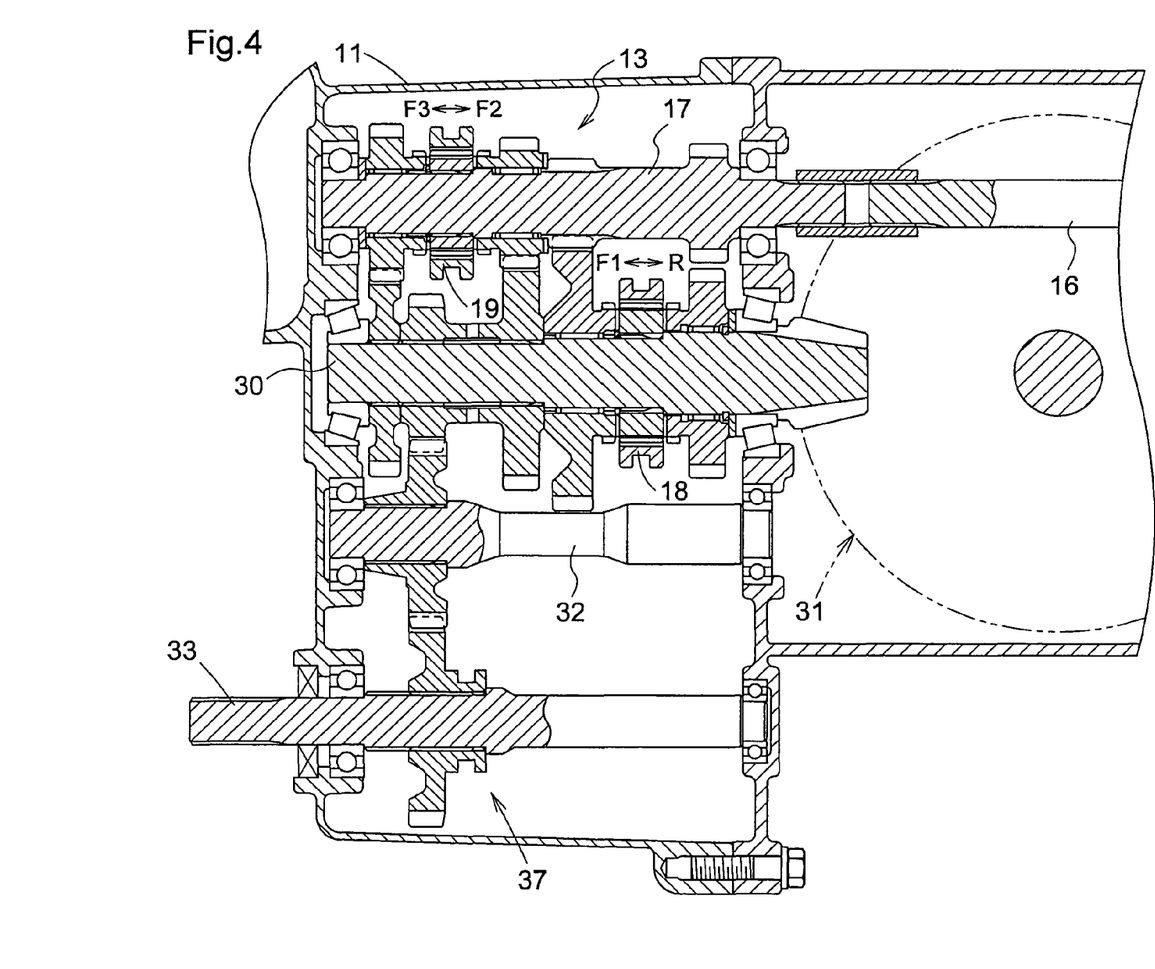
FIG. 4 is a side view in vertical section showing a transmission construction.

FIG. 1 shows a side view of a multi-purpose vehicle as an example of a work vehicle. FIG. 2 is a plan view showing its drivetrain. FIG. 3 is a transmission line diagram thereof. Referring to the basic construction of this work vehicle, a vehicle frame 4 mounts a pair of right and left steerable front wheels 1, an independently suspended pair of right and left rear wheels 2 and an engine 3 mounted between the front and rear wheels. Further, at a front portion of this vehicle frame 4, there is provided a driving section 7 having a seat 5, a sun shade frame 6 and at a rear portion of the vehicle frame 4, there is mounted a damping load-carrying platform 9 which is vertically pivotable by a hydraulic cylinder 8.

The engine 3 is directly connected to a front end of a transmission case 11. This transmission case 11 incorporates, at a rear portion thereof, a main speed-change device 12 utilizing a hydrostatic continuously variable or stepless speed-change unit (HST) and also incorporates, at a front portion thereof, an auxiliary gear speed-change device 13 which effects gear speed-changing operations.

Figure 11:
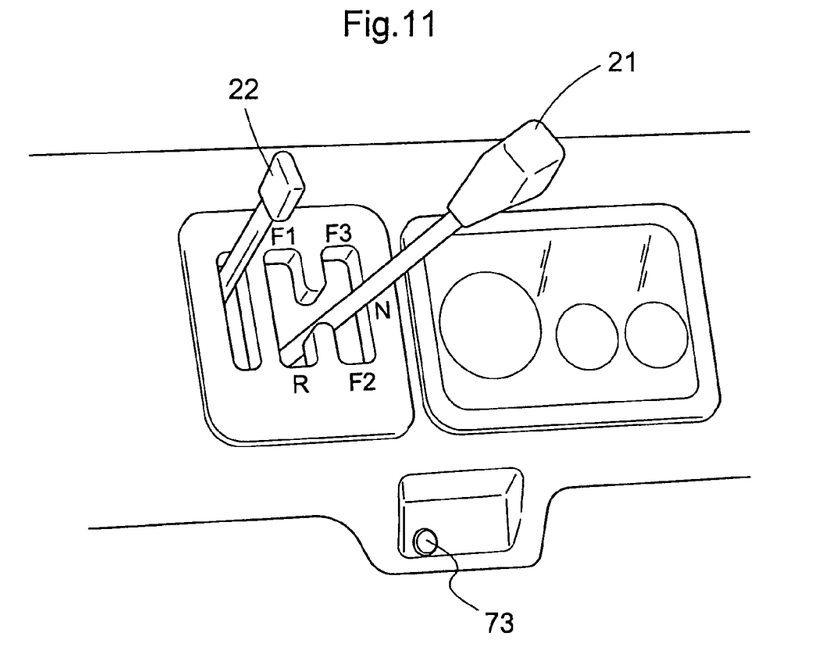
FIG. 11 is a perspective view showing a speed-changing lever, a traveling mode selecting lever, an operational knob, and vicinities thereof.

The output from the engine 3 is transmitted via a man transmission shaft 14 to an input shaft 15 of the main speed-change device 12. And, the speed-changed force of a predetermined rotational direction obtained from an output shaft 16 of the main speed-change device 12 is transmitted via a first transmission shaft 17 to the auxiliary speed-change device 13. The auxiliary speed-change device 13 is constructed as a constant-meshing type device configured to provide a forward first speed (F1) in association with a forward shifting operation of a first shift sleeve 18, a forward second speed (F2) in association with a rearward shifting operation of a second shift sleeve 19, a forward third speed (F3) in association with a forward shifting operation of the second shift sleeve 19, and a reverse mode (R) in association with a rearward shifting operation of the first shift sleeve 18, respectively. The first shift sleeve 18 and the second shift sleeve 19 are wire-connected with a speed-changing lever 21 (see FIG. 11) arranged on a lateral side of a steering wheel 20 in the driving section 7. So that, the three stages of forward traveling operations and the one stage of reverse traveling operation can be effected by shifting the speed-changing lever 21 along an H-shaped speed-changing operational path.

The speed-changed power obtained from the auxiliary speed-change device 13 is transmitted via a second transmission shaft 30 to a rear differential device 31 and transmitted then to the right and left rear wheels 2 in distribution. A portion of the speed-changed power from the auxiliary speed-change device 13 is transmitted via an intermediate transmission shaft 32 to a front wheel drive shaft 33 in distribution, then to a front differential device 36 via transmission shafts 34, 35 and to the right and left front wheels 1 in distribution. The front wheel drive shaft 33 mounts a front wheel drive clutch 37 operable in response to a gear shifting operation for allowing/interrupting power transmission. When this front wheel drive clutch 37 is engaged, there is realized a four-wheel drive traveling mode wherein both the front wheels 1 and the rear wheels 2 are driven. When the front wheel drive clutch 37 is disengaged, there is realized a two-wheel drive mode wherein only the rear wheels 2 are driven. The switching operation of the front wheel drive clutch 37 is effected by a traveling mode selecting lever 22 disposed beside the speed-changing lever 21.

Figure 9:
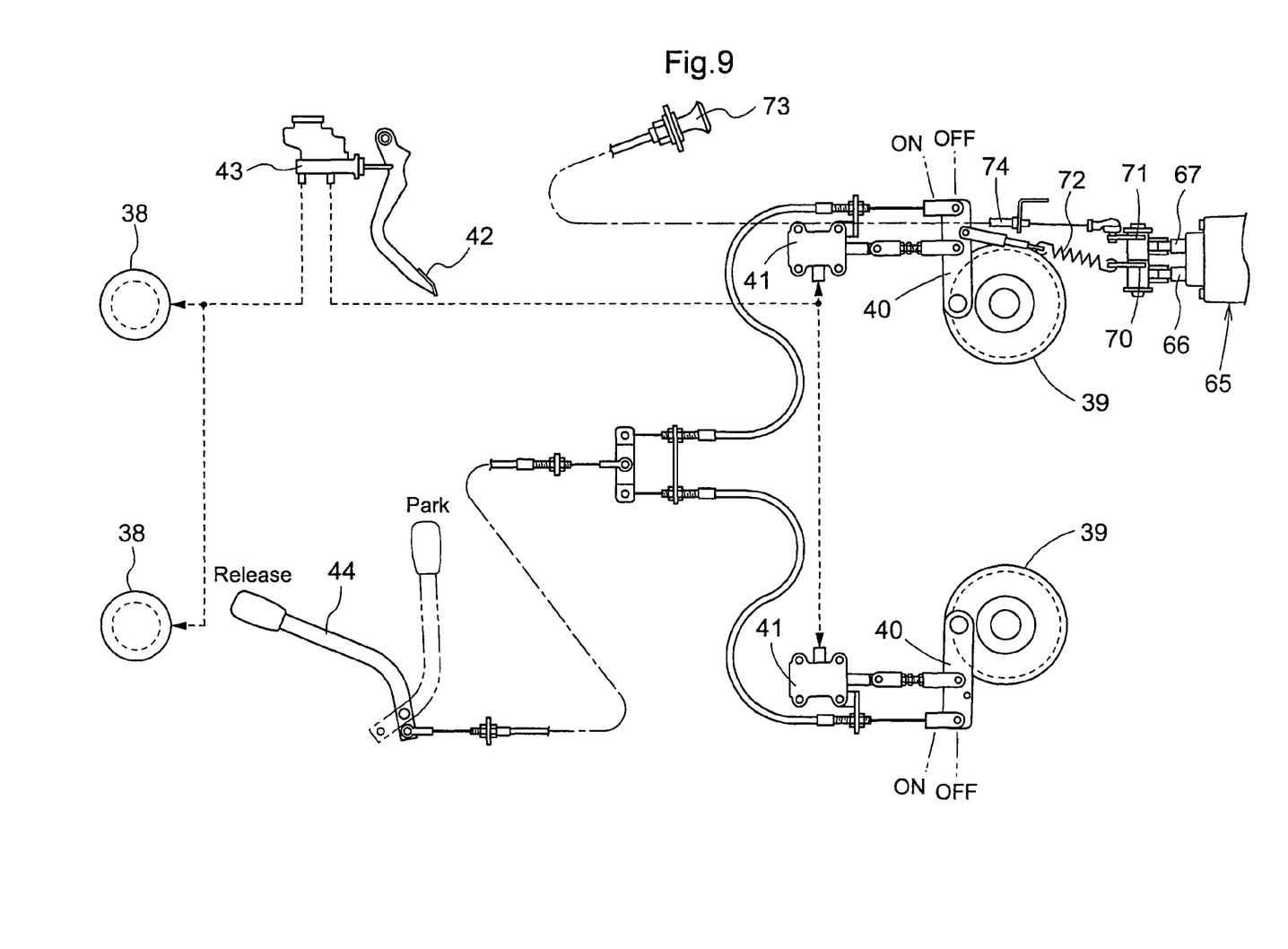
FIG. 9 is a linkage diagram of a brake operating line.

The transmission line to the front wheels 1 and the transmission line to the rear wheels 2 respectively incorporate multi-disc type brakes 38, 39. As shown in FIG. 9, each front wheel brake 38 is operable to compress a group of friction discs thereof in association with a displacement of a piston incorporated therein by a hydraulic operation. Each rear wheel brake 39 is operable to compress a group of friction discs thereof in association with a pivotal movement of a cam (not shown) incorporated therein by pivoting a brake operational lever 40 with an operational cylinder 41. The front wheel brakes 38 and the operational cylinders 41 are pipe-connected to a master cylinder 43 which is operable by a brake pedal 42 disposed near an operator's foot in the driving section 7. In operation, when the brake pedal 42 is stepped on to feed pressure oil from the master cylinder 43, the front wheel brakes 38 are actuated for a braking operation according to the operated oil pressure and also the operational cylinders 41 are retracted to actuate the rear wheel brakes 39 for a braking operation according to the operated oil pressure. When the stepping-on operation of the brake pedal 42 is released, the operated hydraulic pressure ceases to exist, whereby the respective brakes 38, 39 are returned to a braking released condition thereof.

Incidentally, the brake operational lever 40 is wire-connected to a parking lever 44 provided in the driving section 7. When the parking lever 44 is operated to and retained at a "parking" position, a parking condition is realized with actuating the brakes 39 for the right and left rear wheels 2 alone.

Figure 5:
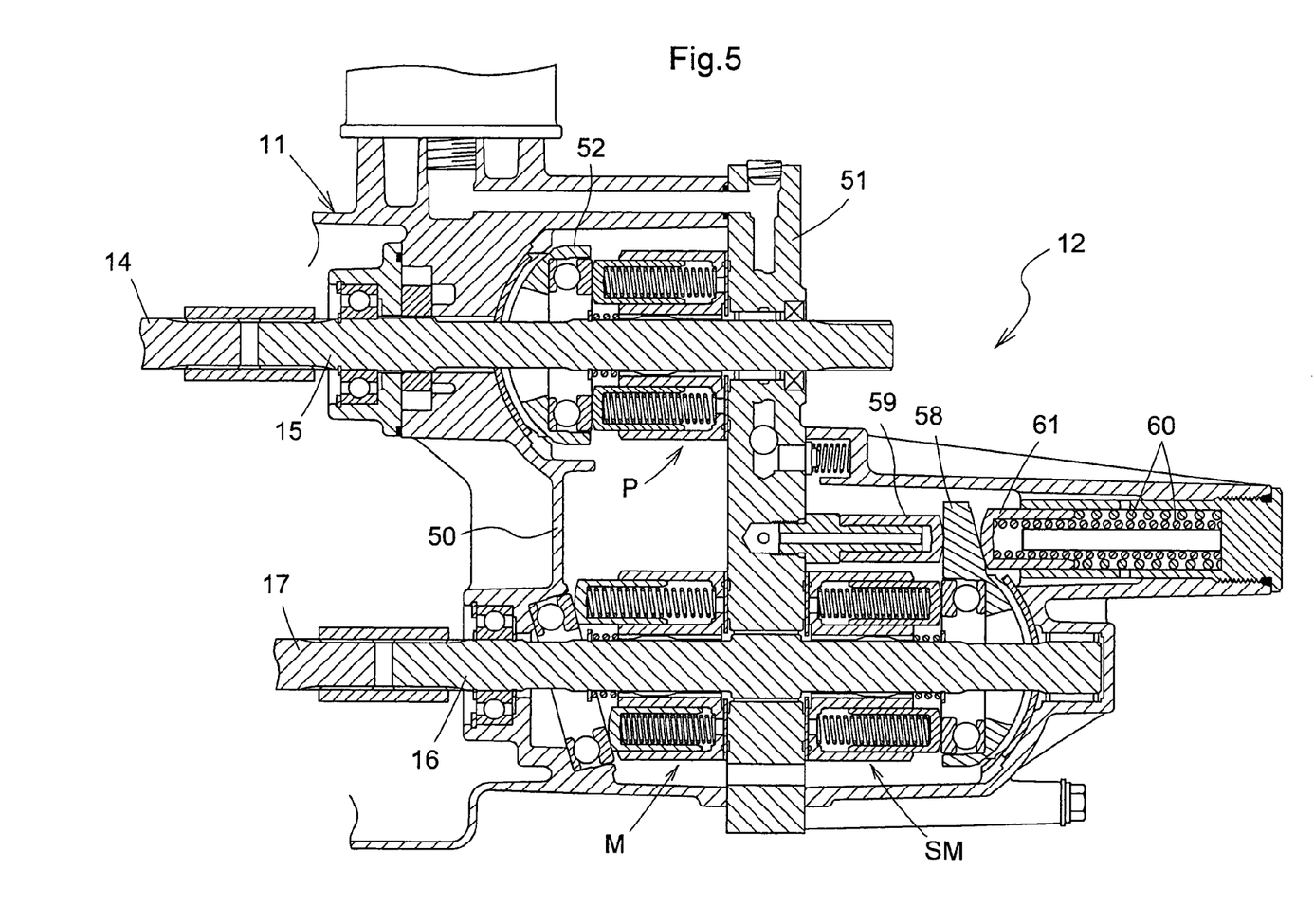
FIG. 5 is a side view in vertical section showing a main speed-change device under a neutral stopped condition.

As shown in FIG. 5, the main speed-change device 12 includes a speed-changing housing 50 formed integral with a rear end portion of the transmission case 11, a port block 51 connected to a rear end of this speed-changing housing 50, a hydraulic pump P and a main hydraulic motor M which are incorporated within the speed-changing housing 50 and an auxiliary hydraulic motor SM mounted outside the port block 41.

The hydraulic pump P is constructed as an axial plunger variable displacement type pump. The main hydraulic motor M is constructed as an axial plunger variable displacement type motor. The auxiliary hydraulic motor SM is constructed as an axial plunger variable displacement type motor. A common motor shaft shared by the main hydraulic motor M and the auxiliary hydraulic motor SM acts as the output shaft 16 of this main speed-change device 12.

As shown in a hydraulic circuit diagram shown in FIG. 8, a swash plate 52 of the hydraulic pump P of the main speed-change device 12 is operatively connected via a hydraulic servo mechanism 54 to an accelerator pedal 53 disposed beside the brake pedal 42, as will be detailed later. When the accelerator pedal 53 is not stepped on, as shown in FIG. 5, the swash plate 52 is maintained at its neutral position (0 degree swash plate angle), so that discharge of pressure oil is stopped, thus realizing a traveling stopped condition. As the accelerator pedal 53 is progressively stepped on, the angle of the swash plate 52 is increased so as to increase the discharge amount, hence, the rotational speed of the output shaft 16 correspondingly.

The hydraulic pump P and the main and auxiliary hydraulic motors M, SM are communicated and connected with each other via a pair of speed-changing oil passages (a), (b) formed within the port block 51. One speed-changing oil passage (a) always has a high pressure as the pressure oil from the hydraulic pump P is fed to the main and auxiliary hydraulic motors M, SM, whereas the other speed-changing oil passage (b) always has a low pressure as this passage acts as a return passage. To both speed-changing oil passages (a), (b), there is connected a charge oil passage (c) for replenishing an amount of leaked oil. This charge oil passage (c) receives supply of pressure oil via a feed oil passage (e) from a charge pump CP driven by the engine power. The pressure (charge pressure) of the charge oil replenished to the charge oil passage (c) is maintained at a set value by a relief valve 55.

The hydraulic servo mechanism 54 is constructed as described below. As shown in FIG. 8, the accelerator pedal 53 is mechanically operatively connected to a servo valve 56 and this servo valve 56 is communicated and connected with a servo cylinder 57. The servo cylinder 57 is operatively connected to a swash plate operating portion of the hydraulic pump P. A displacement of the servo cylinder 57 is fed back to the servo valve 56 by a feedback mechanism FM. Thus, the swash plate 52 of the hydraulic pump P is operated according to a stepped-on position of the accelerator pedal 53. A primary oil passage (f) of the hydraulic servo mechanism 54 is connected to a charge oil feeding oil passage (e), so that the system pressure of the hydraulic servo mechanism 54 is rendered equal to the charge pressure.

The swash plate 58 of the auxiliary hydraulic motor SM is bound from its front and rear sides by a leading end of a control piston 59 and a return piston 61 which is urged forwardly by a return spring 60. In operation, as shown in FIG. 5, when the control piston 59 is retracted to its forward movement limit, the angle of the swash plate 58 of the auxiliary hydraulic motor SM is neutral (0 degree swash plate angle). As the control piston 59 is advanced rearward against the return spring 60, the angle of the swash plate 68 is increased, thus increasing the capacity of the auxiliary hydraulic motor SM correspondingly. As the return spring 60 is assembled with a preload (pre-compression), the swash plate 58 is urged to the neutral position under the preset spring load.

The control piston 59 is connected via a control oil passage (h) to the high-pressure side speed-changing oil passage (a) which feeds pressure oil from the hydraulic pump P to the main and auxiliary hydraulic motors M, SM. When the pressure of the speed-changing oil passage (a) is balanced with the spring force of the return spring 60, the angle of the swash plate 58 is stabilized. Next, an automatic speed-changing operation using the control piston 59 will be explained.

Figure 6:
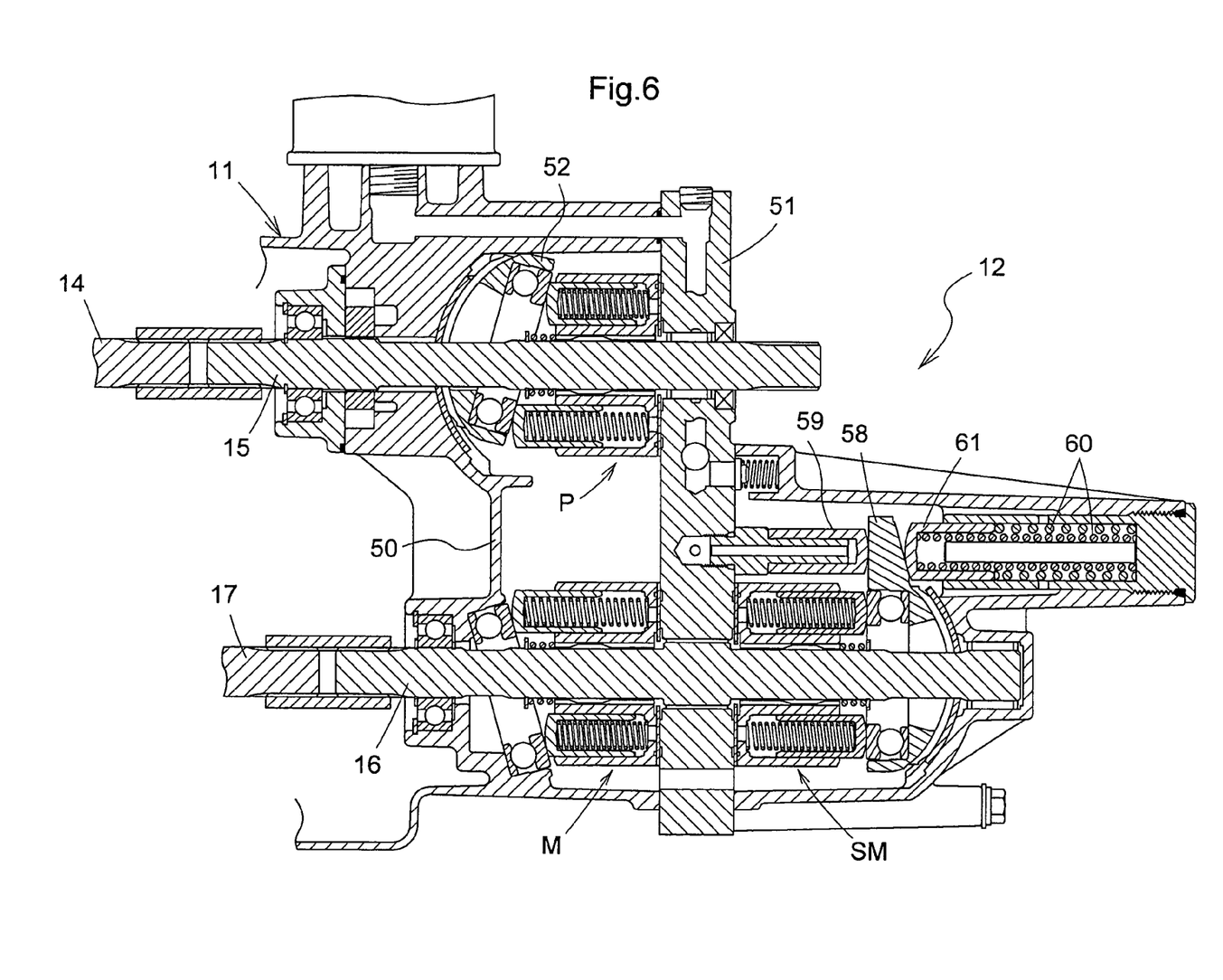
FIG. 6 is a side view in vertical section showing the main speed-change device under a normal load traveling condition.

When the accelerator pedal 53 is stepped on, the angle of the swash plate 52 of the hydraulic pump P is increased, so that an amount of pressure oil corresponding to the swash plate angle is discharged and fed to the main hydraulic motor M and the auxiliary hydraulic motor SM. In this case, if the traveling load is below a set range and the pressures of the speed-changing oil passage (a) and the control oil passage (h) are below set values, the initial spring force of the return spring 60 is greater than the advancing force of the control piston 59 receiving the pressure of the control oil pressure (h). As a result, as shown in FIG. 6, the swash plate 58 of the auxiliary hydraulic motor SM is maintained at its neutral position (0 degree swash plate angle), so that the entire amount of the pressure oil from the hydraulic pump P will be fed to the main hydraulic motor M and the output shaft 16 will be driven by this main hydraulic motor M alone.

Figure 7:
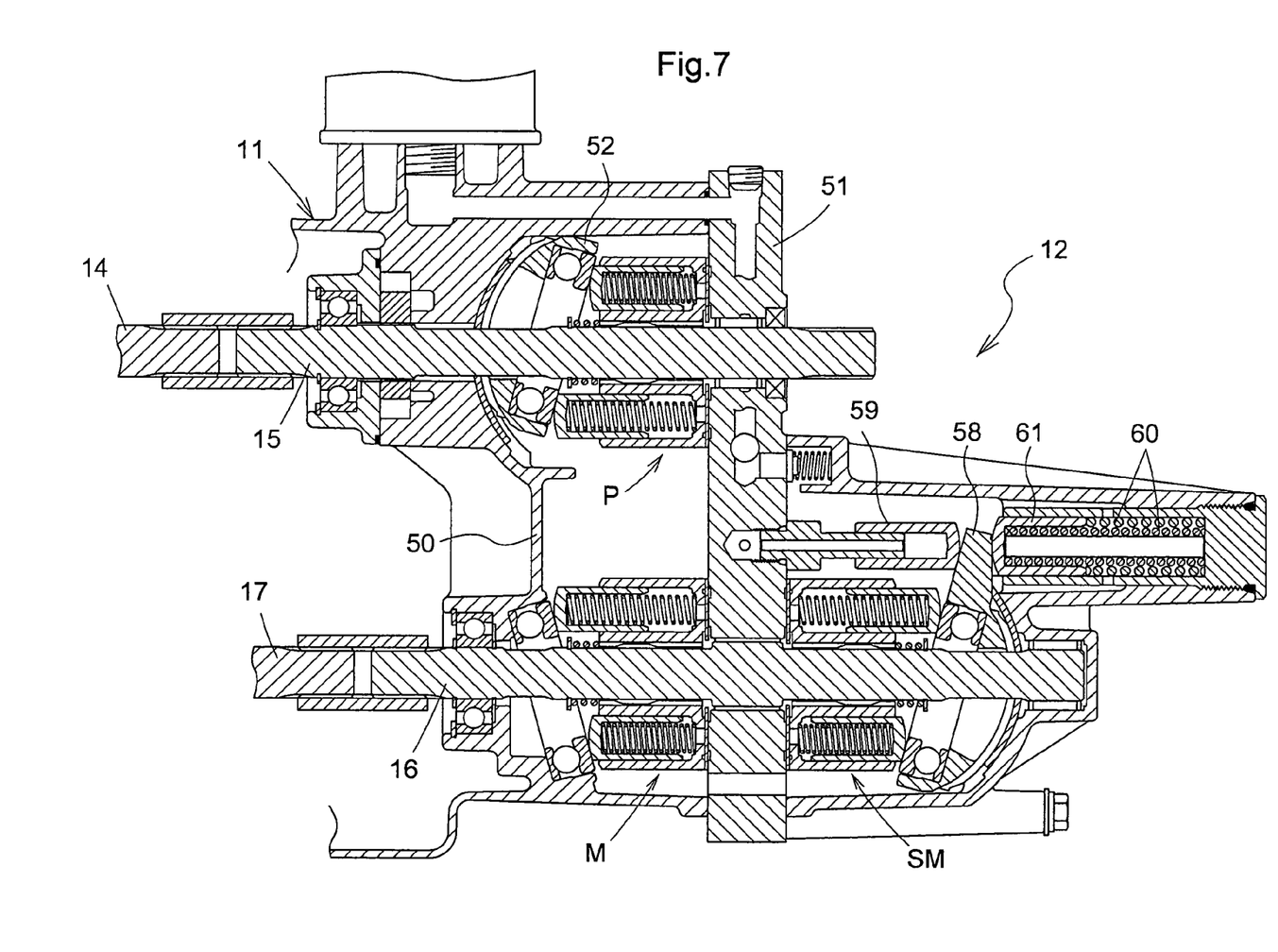
FIG. 7 is a side view in vertical section showing the main speed-change device under a high load traveling condition.

Now, when the traveling load exceeds the set range and the pressures of the speed-changing oil passage (a) and the control oil passage (h) exceed the set values, the advancing force of the control piston 59 receiving the pressure of the control oil passage (h) becomes greater than the initial spring force of the return spring 60. As a result, as shown in FIG. 7, the angle of the swash plate 58 of the auxiliary hydraulic motor SM is increased to create a motor capacity in the auxiliary hydraulic motor SM, such that the pressure oil from the hydraulic pump P will be fed to the main hydraulic motor M and the auxiliary hydraulic motor SM. That is to say, when the traveling load exceeds the set range, this automatically results in increase in the total capacity of the motor side, so that the output shaft 32 is driven in deceleration whereas the output torque is increased correspondingly.

When the swash plate angle of the auxiliary hydraulic motor SM becomes maximum with increase in the traveling load and then if this traveling load further increases, the pressure of the speed-changing oil passage (a) will be even higher. In this, the pressure of the speed-changing oil passage (a) acts as a reaction force for returning the swash plate 52 of the hydraulic pump P to its neutral and under a normal load condition, this reaction force is supported by the servo cylinder 57 of the hydraulic servo mechanism 54. However, when the pressure of the speed-changing oil passage (a) becomes especially high as described above and the hydraulic reaction force applied to the swash plate 52 becomes very large, it becomes no longer possible to maintain the swash angle by the servo cylinder 57 which operates with the low system pressure equal to the charge pressure. As a result, the hydraulic reaction force causes automatic and forcible displacement of the swash plate 52 to the swash angle decreasing side, i.e. to the decelerating side, so that the pressure of the speed-changing oil passage (a) will be increased and the output torque will be increased correspondingly.

Incidentally, though explanation of its detailed construction will be omitted, the accelerator pedal 53 for operating the main speed-change device 12 is operatively connected also to a speed controlling mechanism (not shown) for varying the rotational speed of the engine 3, so that this pedal 53 functions also as an accelerating pedal. So, under the traveling stopped condition without stepping-on of the accelerator pedal 53, the engine 3 has an idling rotational speed. As the accelerator pedal 53 is stepped on to increase the traveling speed, the rotational speed of the engine is increased correspondingly.

Figure 8:
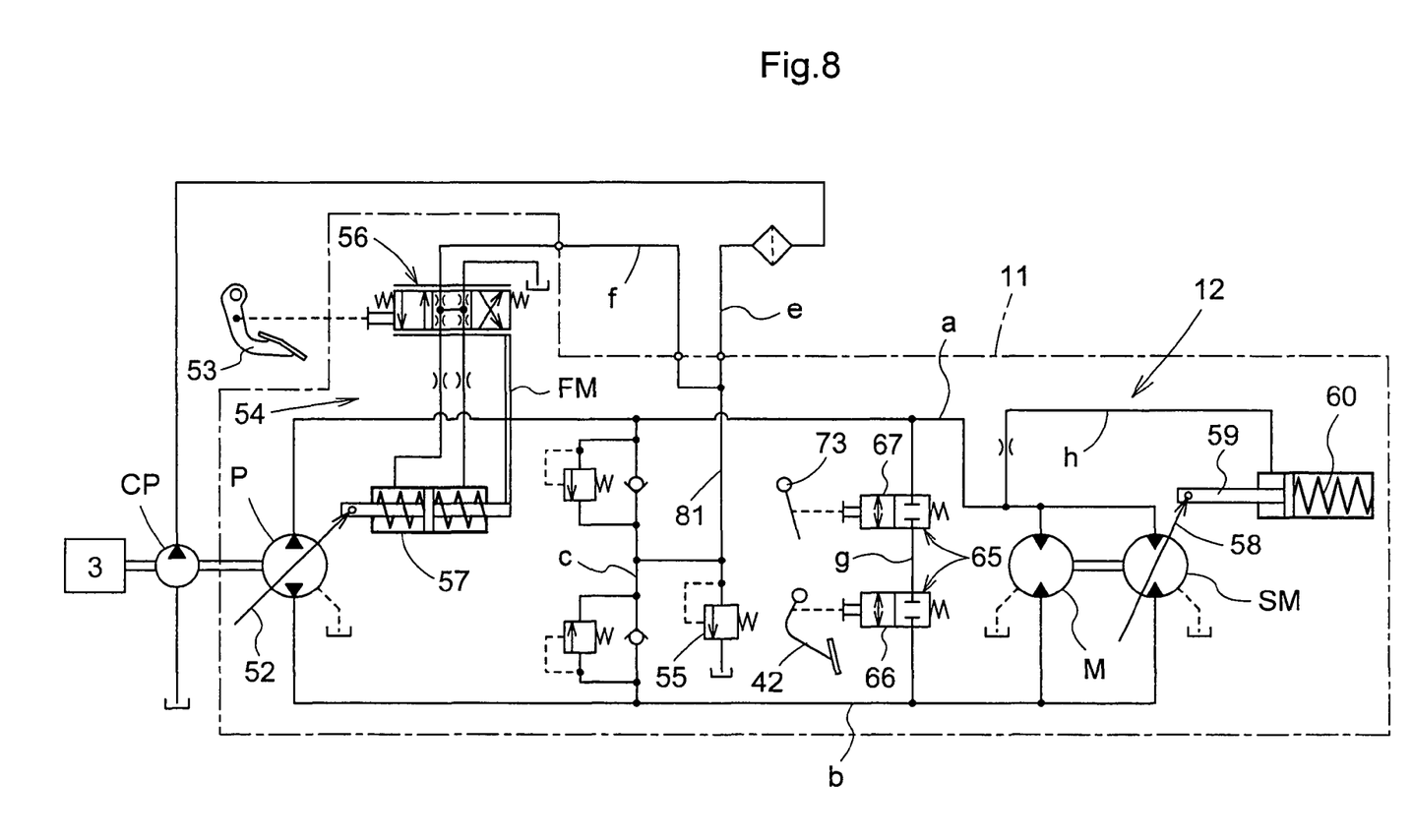
FIG. 8 is a hydraulic circuit diagram of the main speed-change device.
Figure 10:
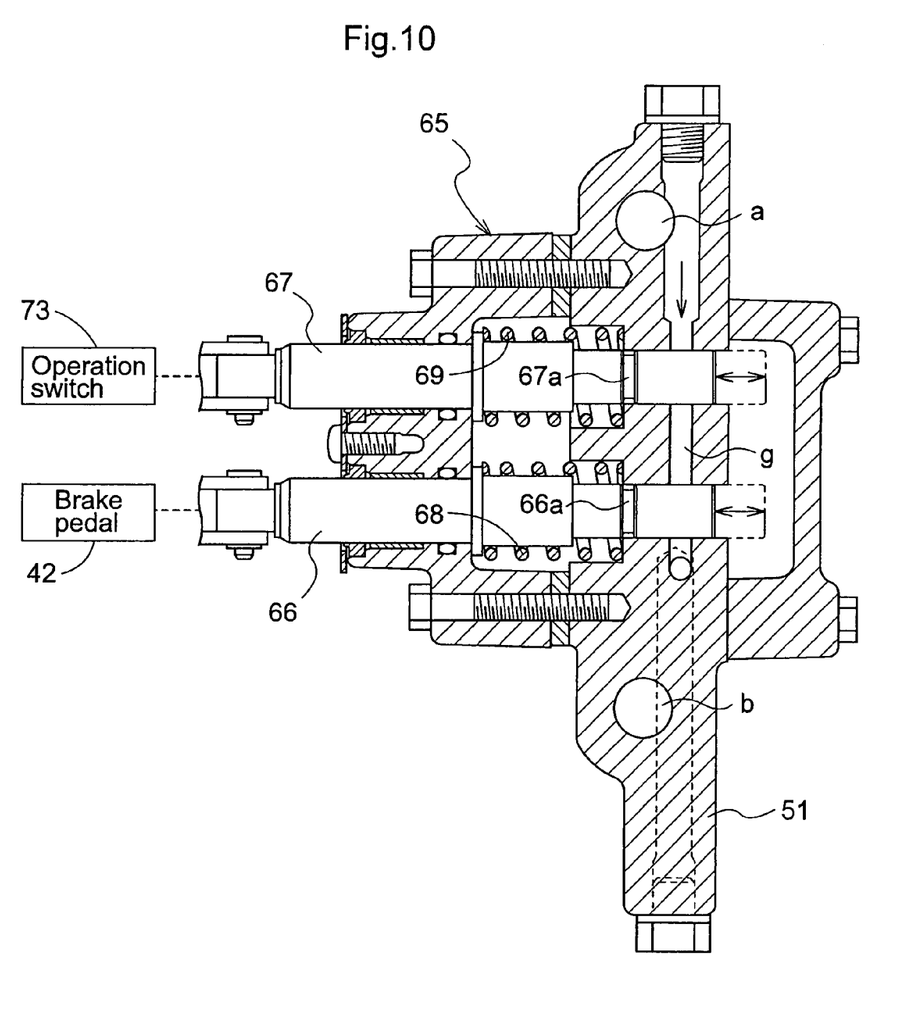
FIG. 10 is a section view of a valve mechanism.

As shown in the hydraulic circuit diagram of FIG. 8, between the speed-changing oil passages (a) and (b) of the main speed-change device 12, there is provided a bypass oil passage (g) which incorporates a valve mechanism 65 for opening and closing this bypass oil passage (g). The valve mechanism 65 includes a pair of opening/closing spool valves 66, 67 of linear sliding type arranged in series with respect to the bypass oil passage (g). As shown in FIG. 10, the opening/closing spool valves 66, 67 are assembled within the port block 51 and are slidably urged to respective passage closing positions thereof by means of return springs 68, 69 incorporated therein respectively and slidably operable independently of each other by means of operational levers 70, 71 pivotable about respective vertical axes thereof.

The operational lever 70 of the opening/closing spool valve 66 which is located on the low-pressure speed-changing oil passage (b) of the pair of opening/closing spool valves 66, 67 is operatively connected via a coupling spring 72 to the brake operational lever 40 for one rear wheel brake 39. In operation, when the brake pedal 42 is stepped on for a braking operation, the opening/closing spool valve 66 is pressed and displaced against the return spring 68, so that a groove 66a formed in the outer periphery of the spool valve 66 is operated to a passage opening position facing the bypass oil passage (g). Upon release of the stepping-on of the brake pedal 42, the opening/closing spool valve 66 is returned to the passage closing position. In this case, although the opening/closing spool valve 66 will receive the pressure from the speed-changing oil passage (b) as a radial load, this radial load is not large since the speed-changing oil passage (b) is the return side low-pressure oil passage. As a result, the opening/closing spool valve 66 can be slidably displaced without mush frictional resistance.

The other opening/closing spool valve 67 which is located on the high-pressure speed-changing oil passage (a) of the pair of opening/closing spool valves 66, 67 is operatively connected via an operational wire 74 to an operational knob 73 ("operating member") arranged adjacent the speed-changing lever 21 in the driving section 7. In operation, as the operational wire 74 is pulled by pulling the operational knob 73, the opening/closing spool valve 67 is pressed and displaced as desired against the return spring 67, so that a groove 67a formed in the outer periphery of the spool valve 67 is operated to a passage opening position facing the bypass oil passage (g).

The traveling transmission construction relating to the present invention is constructed as described above. By adjustably stepping on the accelerator pedal 53, with the auxiliary speed-change device 13 being selectively operated into one of the forward three speed stages or the reverse one speed stage by the speed-changing lever 21, a desired speed-changing operation and an accelerating/decelerating operation is made possible.

In operating the speed-changing lever 21, in order to enable smooth switching shifts of the first shift sleeve 18 and the second shift sleeve 19, the operator will remove his/her foot from the accelerating pedal 53 and step on the brake pedal 42 instead, thus applying a braking while returning the main speed-change device 12 to the neutral position. Depending on the traveling condition, however, it may happen that the auxiliary speed-change device 13 is operated while the main speed-change device 12 has not yet fully returned to the neutral position. In such case, due to the torque being generated, the switching shifts of the first shift sleeve 18 and the second shift sleeve 19 cannot be effected smoothly. Then, in such case, the operational knob 73 will be pulled to open the opening/closing spool valve 67 to open up the bypass oil passage (g), thus releasing the pressure of the speed-changing oil passage (a) to the speed-changing oil passage (b), whereby the generation of torque from the output shaft 19 is stopped. As a result, the switching shifts of the first shift sleeve 18 and the second shift sleeve 19 can be effected smoothly, without being affected by any input torque.

Other Embodiments (1) In the foregoing embodiment, for causing the bypass oil passage (g) to be opened only when the two operations are effected at one time, the valve mechanism 65 includes the pair of opening/closing spool valves 66, 67 arranged in series, so that the bypass oil passage (g) is opened in association with openings of the two opening/closing spool valves 66, 67. Instead of this, a single opening/closing spool valve may be operatively connected to the brake pedal ("brake operating member") 42 and the operational knob 73 respectively, so that the bypass oil passage (g) will be opened up only when both the brake pedal 42 and the operational knob 73 are operated.

(2) In the foregoing embodiment, the main speed-change device 12 effects stepless speed-changing operations in one predetermined rotational direction and the auxiliary speed-change device 13 effects a plurality of stages of speed-changing operations including forward/reverse switchover operations. Instead, the main speed-change device 12 may be used for effecting the forward/reverse switchover operations and the stepless speed-changing operations, whereas the auxiliary speed-change device 13 may be used for effecting a further plurality of stages of speed-changing operations.

(3) The brakes 38, 39 for stopping traveling may be adapted to be operable by the brake lever ("brake operating member 42") provided in the driving section 7.

(4) As the manual operating member for opening and closing the other opening/closing spool valve 67 in the valve mechanism 65 as desired, instead of using the knob 73 as described above, it is possible to utilize an operational pedal which is operable by the operator's left foot which is not used for stepping on the brake pedal 42 and the accelerator pedal 53.

(5) Preferably, the auxiliary speed-change device 13 is constructed as the constant mesh type or synchromesh type with which smooth speed-changing operations are readily possible. However, this auxiliary speed-change device 13 can be a simple gear-shift type mechanism in which gear meshing conditions are selected.

Figure 12:
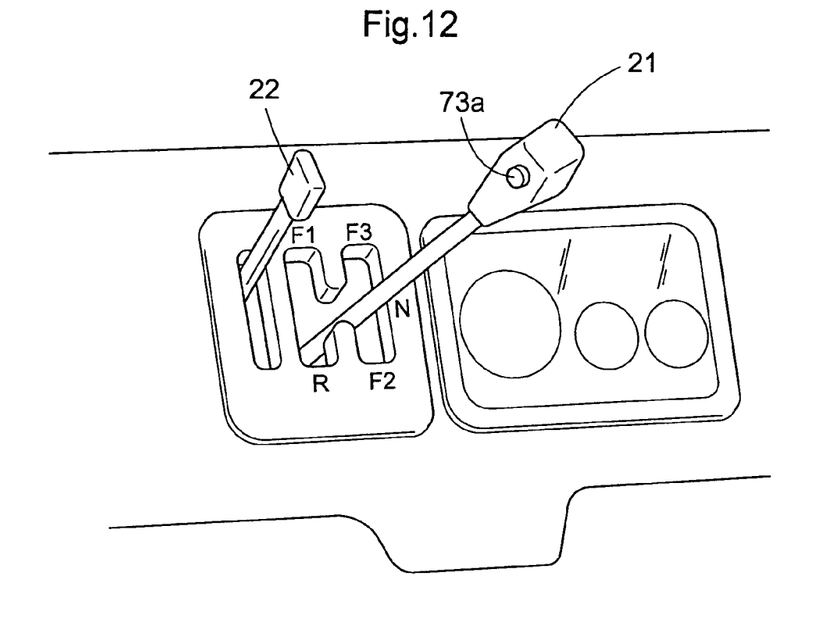
FIG. 12 is a perspective view showing a speed-changing lever, a traveling mode selecting lever, an operational knob, and vicinities thereof, relating to a further embodiment.

(6) As shown in FIG. 12, an operational button ("manual operating member") 73*a* for operating one spool valve can be included in the speed-changing lever 21 of the speed-change device. This operational button 73*a* can be configured to operate the spool valve with mechanical coupling of a cam, a shaft, etc. as in the conventional art, or can be configured to operate the spool valve in response to a signal.

What is claimed is:

1. A work vehicle comprising:
   a hydrostatic continuously variable speed-change device including:
      an input shaft to which engine output is transmitted;
      a hydraulic pump for receiving drive power from the input shaft;
      a hydraulic motor for receiving pressure oil from the hydraulic pump through a first speed-change oil passage and for returning discharged oil to the hydraulic motor through a second speed-change oil passage;
      an output shaft to which driver power is transmitted from the hydraulic motor;
      a bypass oil passage communicating the first and second oil passages with each other; and
      a valve mechanism for opening and closing the bypass oil passage;
   a gear multiple-stage speed-change device to which drive power is inputted from the output shaft;
   a manual operating member provided in a driving section for opening and closing the valve mechanism; and
   a brake operating member included in a drivetrain for operating a brake;
   wherein said brake operating member is operatively connected to said valve mechanism such that said valve mechanism is opened in response to an operation of the brake operating member thereby stopping output of drive power from the output shaft.

2. A work vehicle comprising:
   a hydrostatic continuously variable speed-change device including:
      an input shaft to which engine output is transmitted;
      a hydraulic pump for receiving drive power from the input shaft;
      a hydraulic motor for receiving pressure oil from the hydraulic pump through a first speed-change oil passage and for returning discharged oil to the hydraulic motor through a second speed-change oil passage;
      an output shaft to which driver power is transmitted from the hydraulic motor;
      a bypass oil passage communicating the first and second oil passages with each other; and
      a valve mechanism for opening and closing the bypass oil passage, the valve mechanism is opened thereby stopping output of drive power from the output shaft;
   a gear multiple-stage speed-change device to which drive power is inputted from the output shaft;
   a manual operating member provided in a driving section for opening and closing the valve mechanism; and
   a brake operating member for operating a brake in a drivetrain;
   wherein said valve mechanism includes a pair of opening/closing spool valves arranged in series in said bypass oil passage;
   one of said opening/closing spool valves is operatively connected to said brake operating member; and
   the other opening/closing spool valve is operatively connected to said manual operating member, provided in the driving section, different from said brake operating member.

3. The work vehicle according to claim 2, wherein said one opening/closing spool valve operatively connected to said brake operating member is disposed on a low-pressure side of said bypass oil passage.

4. The work vehicle according to claim 1, wherein said manual operating member is provided in an operating member for said multiple-stage speed-change device.

5. The work vehicle according to claim 2, wherein said manual operating member is provided in an operating member for said multiple-stage speed-change device.

* * * * *